United States Patent Office 3,369,969
Patented Feb. 20, 1968

3,369,969
COLIBACILLI CONTAINING MEDICAMENT AND A METHOD OF PREPARING SAME
Lucien Nouvel, 91 Avenue des Ternes, Paris 17, France
No Drawing. Filed Feb. 24, 1964, Ser. No. 347,016
Claims priority, application France, Mar. 1, 1963, 926,515
7 Claims. (Cl. 167—55)

The present invention has for its object a new medicament based on non-pathogenic living colibacilli and resistant to antibiotics. It is concerned more particularly with stable medicinal compositions intended for the treatment of intestinal affections connected with a lack of balance of the intestinal flora.

It is known that the presence of non-pathogenic colibacillus, the normal and majority host of the colon, is indispensable in the intestine, because the said colibacillus exerts at the same time a digestive action particularly on cellulose, which only it is able to digest, and a metabolic action, by the endointestinal synthesis of vitamins, and particularly those of groups B and K.

It is also known that the increasingly frequent use of sulphamides and antibiotics with a large operative spectrum leads to the destruction of the useful intestinal flora, and particularly of non-pathogenic colibacilli, simultaneously with the destruction of the harmful germs.

With the object of avoiding the lack of balance thus created in the intestinal flora, it has already been proposed for many years to cause the invalids affected by gastroenteritis, anterocolitis and other intestinal affections, including therein the troubles due to the absorption of antibiotics, to absorb medicines which have the base of living non-pathogenic colibacilli, preferably of specifically intestinal origin, and capable of also including other active constituents, for example iron; such medicines are described in Hippokrates, vol. 24, page 336 et. seq. (1953), as well as in Die Medizinische, No. 46, pages 1615-1617 (1955).

Very recently, it has been proposed to associate glutamic acid with the living non-pathogenic colibacilli, such as for example those extracted from the Escherichia coli Communis strain, cultivated in an appropriate concentration medium (Special French Medicament Patent No. M. 1275). The presence of this acid permits of improving the implantation of the colibacillus in the intestine and of re-seeding the colon in a lasting manner.

According to the present invention, it is even possible appreciably to increase the efficacy of the medicines based on living non-pathogenic colibacilli, by associating with them substances which permit at the same time a rapid re-seeding of the colibacilli in the intestine and an immediate stabilisation of the living germs introduced into the intestinal flora.

The medicine according to the invention comprises the following essential constituents:

an aqueous suspension of microorganisms of living non-pathogenic colibacilli;
an amino acid or its alkali metal salt, such as more particularly glutamic acid or sodium glutamate;
an amino yeast extract;
a thickener for the aqueous supension, as for example gelose, peptin, gum arabic, alkyl cellulose or analogous substances;
a buffering agent making it possible to standardise the pH of the aqueous culture suspension of the colibacilli.

The applicant has in fact established that the presence in the medicine of a substance or of several substances serving to buffer the pH enabled the mixtures of culture broths of the colibacilli with glutamic acid to be stabilised and the action of the bacilli in the intestinal wall to be accelerated.

The pH of the aqueous suspension should be kept between 4 and 9 and preferably between 6 and 7.8, with an optimum for values contained between 6.9 and 7.4. As buffering substances which can be used for this purpose, it is possible to mention in non-limitative manner mixtures in appropriate proportions, as for example the pairs: d,1-aspartic acid and d,1-sodium aspartate, monosodium tartrate and disodium tartrate, monosodium citrate and disodium citrate, disodium citrate and trisodium citrate, acetic acid and sodium acetate, glutamic acid and sodium glutamate, disodium phosphate and monopotassium phosphate, d,1-cystein (or d,1-tyrosine) and their hydrochlorides, ammonia and ammonium chloride, etc.

One advantageous form of the invention consists in adding other useful microorganisms to the colibacilli, more especially normal microorganisms of the human intestine. Thus, the new medicine may comprise, in addition to non-pathogenic colibacilli which are resistant to antibiotics, one or more of the non-pathogenic aerobic and/or anaerobic species, as for example lactic bacilli, staphylococci, enterococci, bacillus subtilis, bacteroids, bacillus bifidus var. Tissier or var. Pennsylvanicus, clostridium naviculus, clostridium polymyxa. It is found that the particular composition of the medium according to the invention, especially the presence of a pH buffering agent, also profits from these different microorganisms and permits of the rapid implanting thereof in the intestine, in addition to the coli itself; thus, the equilibrium between the colibacillus and the other bacteria in the intestinal flora is advantageously achieved with the medicine according to the invention. It is of course necessary to avoid the presence of coli bacteriophages. Preferably, the medicine contains proportions of different microorganisms, calculated on those of the normal flora of the intestines; this means that it is necessary to have more anaerobes than aerobes. Although the number of other bacilli can vary to a large degree with respect to that of the coli, for example in the ratio of 0.1 to 10, it is preferable that the number of bacilli such as bifidus, clostridium, etc., is much greater, particularly 5 to 10 times that of the colibacilli. Obviously, in the devising of the mixture formula of the different cultures, allowance is made for the vitality of each of the selected strains.

Furthermore, the compositions according to the invention can contain substances which permit the intestinal wall to be protected, as for example kaolin, bismuth salts, alumina gels; materials necessary for the proteic stratum of the microorganisms, such as peptones (meat, fibrin, etc.) with a high content of growth factors; metal salts, such as for example, sulphates or phosphates of magnesium, iron, etc.

The non-pathogenic colibacilli used in the medicinal compositions according to the invention can be obtained by the conventional processes. For example, after having isolated the desired colibacillus strain from stools of a healthy individual, the microorganisms are cultivated on one or more appropriate concentration media, as for example the Muller-Kaufmann medium and the Kristensen-Kaufmann medium. The strain which is obtained is then typed by its precise antigenic characters and a coagulating serum is prepared in order to permit a rapid diagnosis.

The microorganism is characterised by its typical biochemical reactions in the group of the enterobacteriaceae, namely: gram-negative, negative reaction with urea, negative hydrogen sulphide reaction, positive reactions with mannitol, glucose, lactose and indol.

The microorganism, thus typed and characterised is cultivated in a concentration broth which contains the specific ingredients of the invention as specified above. Starting from this culture, there are selected the individuals which are resistant to the principal known antibiotics, either by the method known as the "gradient" method, or by introducing a determined quantity of antibiotic into the culture medium of the strain. Periodically, the culture is re-seeded in the broth containing the antibiotics and the antibiotic resistance is checked on a Petri dish. The culture is also checked by being brought into contact with agglutinant serums or by a specific bactecoliphage of the forms capable of initiating infantile gastroenteritis and typed under the names 111 B4, 55 B5, 26 B6, 86 B7, 119, B14, 127 B8, 125 B15, 126 B6 and 128 B12 (products marketed by the Pasteur Institute).

The culture can then be produced on a large scale and the suspension thus obtained is distributed in sealed drinkable ampoules or even lyophilised and dispensed in bottles or in capsules.

The lyophilisation of the cultures according to the invention can be carried out in the usual manner, but it is possible to obtain an even better medicine by using a powder prepared by a special lyophilisation process which also forms part of the present invention.

When a bacterial culture is lyophilised according to the prior art, a large number of microorganisms is destroyed, but on the contrary a much larger survival percentage is obtained in surprising manner when the medium subjected to the lyophilisation contains certain particular substances, more especially mucopolysaccharides.

The special lyophilisation process according to the invention consists in introducing into the culture broth which is intended to be frozen, one or more mucopolysaccharides which are taken particularly in the mucin form. This addition can take place before or after the culture itself, but it is more advantageous to introduce the mucin into the nutrient broth on which the non-pathogenic colibacilli are seeded; this broth constitutes a proliferation medium and not only a preservation broth, as in the case of placing in ampoules.

The new lyophilisation process thus preferably comprises: the culture of non-pathogenic colibacilli which are resistant to antibiotics in a nutrient medium buffered to pH 6.9 to 7.4 and containing mucin; the centrifuging of the culture which is obtained; the re-suspension of the centrifuged substance in a sugared and buffered liquid containing the mucin; freezing of this suspension and sublimation of the ice under strong vacuum.

Although the composition of the mucins varies according to the origin of these substances which constitute the mucus and although it is relatively complex, the mucins nevertheless constitute well-defined products. Bibliographic data are to be found regarding their composition, properties and preparation, including the very recent article by Ward Pigman "Comparative study of mucins of various origins" which appeared in the Exposes Annuels de Biochimie Medicale, 1963, pages 67-84. It is more particularly known that the mucins, whether they are of submaxillary, sublingual, gastric, intestinal or genital origin, contain amino acids, glucides or hexosamines. They all seem to be charactised by the presence of sialic acid.

The most practical source of mucins are the organs or glands of animals, particularly ovines and bovines. The composition varies according to the species of animal and the nature of the organ or gland and obviously according to the method of extraction and purification of the mucin. Nevertheless, the mucins of animal origin extracted by the conventional method are all suitable for the preparation of the medicine according to the invention.

The mucin content can vary according to the composition of the broth and it is generally of the order of 2 to 100 g. per litre, and best of all from 5 to 30 g. The quantity of mucin present is preferably equal to about 2 to 50% of the total weight of the nutrient substances of the broth, both nitrogenous and glucidic, taken as a whole; a proportion of 2 to 25% is generally sufficient for increasing the number of microorganisms surviving the lyophilisation.

One particularly recommended method of absorption of the medicament according to the invention consists in dissolvng a sachet containing a mixture of aromatised sugars, as for example a mixture of lactose (0.66 g.) saccharose (1.35 g.) and orange essence (0.01 g.) in the water provided for diluting the drinkable ampoule. The contents of the sachet contributes to the suspension of the colibacilli at the instant of mixing in the water to be drunk, the necessary supply for the immediate reproduction of the microorganisms of the bacterial culture.

The following examples, given in non-limitative manner, illustrate the present invention. Example 1 describes a process for the production of a medicinal composition according to the invention. Examples 2 to 50 show therapeutic applications of the medicine obtained according to Example 1.

EXAMPLE 1

The culture broth is prepared with the following composition:

| | Grams |
|---|---|
| Glutamic acid | 1000 |
| Amino extract of yeast | 2000 |
| Gelose | 500 |
| Disodium phosphate | 4150 |
| Monopotassium phosphate | 350 |
| Sterile distilled water: quantity adjusted to 500 litres. | |

The broth, of which the pH is kept in the region of 7.3–7.5, is then transferred to the autoclave, and centrifuged and sterilised. After cooling, the broth is seeded with 500 ml. of an aqueous suspension, prepared about 3 hours previously, of a culture of living non-pathogenic colibacilli developed on inclined nutritive gelose. The suspension thus obtained is kept at 37° C. for about 3 hours, with agitation and with bubbling of sterile air.

After this time, the liquid obtained is ready to be placed in ampoules, obviously in the absence of any trace of contamination.

EXAMPLE 2

*Lyophilisation by the known method.*—The liquid obtained as in Example 1 is subjected to centrifuging; the collected concentrate is re-suspended in 50 litres of fresh initial broth and then frozen at −35° C. After subsequent sublimation in vacuo of the ice of this suspension, there is obtained a dry powder which is distributed in sterilised gelatine-coated pills wth 0.5 g. of powder.

EXAMPLE 3

*Lyophilisation by the special process of the invention.*—The liquid obtained as in Example 1 is subjected to centrifuging; the collected concentrate is re-suspended in 50 litres of a broth containing mucopolysaccharides; the composition of this liquid is as follows:

| | Kg. |
|---|---|
| Mucin of (animal) sublingual origin | 1 |
| Lactose | 15 |
| Milk | 2 |
| Thiourea | 0.15 |
| Vitamin C | 0.5 |
| Ammonium hydrochloride $NH_4Cl$ | 0.5 |
| Water: quantity sufficient for 100 litres. | |

The suspension is placed in the tanks of a known sublimation apparatus (Edwards & Co. type) which is cooled beforehand; it is frozen between −35° and −50° C., the chilling period being 45 minutes. While gradually reheating the apparatus, the sublimation is carried out at a pressure of about 0.2 mm. Hg for 13 hours with a thickness of material of 1.5 to 3 cm. on the plates of the apparatus; the temperature on completing the operation is 31° C. Finally, the vacuum is forced to about 0.05 mm. Hg in order sufficiently to dehydrate the powder which is obtained; the latter does not contain more than 1 to 2% of moisture when the lyophilisation is completed.

The powder prepared in this way is placed in gelatine-coated pills, each of about 0.5 g. It is found that the number of microorganisms which have survived the freezing is 10 to 20% higher than in Example 2 for the same chilling period and temperature.

EXAMPLE 4

A culture broth is prepared which has a fairly high concontration of nutritive substances and having, as novel characteristic, the presence of mucopolysaccharides of animal origin. This broth contains:

|  | Kg. |
|---|---|
| Peptic peptone | 3 |
| Lactose | 1 |
| Milk | 0.5 |
| Glutamic acid | 0.2 |
| Submaxillary animal mucin | 1 |
| Water: quantity to make 100 litres. | |

The pH of this broth is adjusted to between 6.9 and 7.4 and seeding is carried out with a strain of living, non-pathogenic colibacilli which are resistant to antibiotics.

After a culture period of 18 hours at 370 C., the broth is subjected to centrifuging on a Sharples centrifuge rotating at 17,000 r.p.m.; the centrifuged substance which is obtained in 10 litres of liquid according to Example 3 containing mucin, and ammonium hydrochlorine in order to stabilise the pH value. The lyophilisation is then carried out in exactly the same way as in Example 3. The powder obtained is placed in sterilised gelatine-coated pills, also at the rate of 0.5 g. in each.

The presence of mucosaccharide has had a protective effect on the microorganisms, the survival of which after the lyophilisation was 20 to 30% better than that of the colibacilli which had undergone the treatment according to Example 2, for the same period of chilling to the same temperature.

EXAMPLE 5

The lyophilisation of Example 3 is carried out after the centrifuged colibacillus substance has had added thereto a centrifuged substance originating from the culture of bacillus bifidus var. Tissier in a broth containing:

|  | Kg. |
|---|---|
| Pancreatic peptone of yeast | 2 |
| Pancreatic peptone of casein | 0.5 |
| Glucose | 1 |
| Monopotassium phosphate | 0.2 |
| Concentrated tomato juice | 1 |
| Water: quantity to make 100 litres at a pH value of 6.5 to 6.7. | |

The proportions are so arranged as to have about 10 to 20% of colibaccili to 90 to 80% of bifidus, in the lyophilised powder.

EXAMPLE 6

A powder similar to that of Example 5 is prepared by substitution of bifidus var. Pennsylvanicus for the previous culture. The culture of this bifidus has taken place in a liquid containing:

|  | Kg. |
|---|---|
| Pancreatic peptone of fibrin | 1 |
| Purified amino extract of yeast | 1 |
| Glucose | 1 |
| Sodium acetate | 0.8 |
| Monopotassium phosphate | 0.2 |
| Water: quantity sufficient for 100 litres pH 6.7. | |

EXAMPLE 7

Using the technique of Examples 4 and 5, a powder is prepared by lyophilisation, in which the non-pathogenic colibacilli which are resistant to antibiotics are accompanied by other intestinal microorganisms, namely: 5 bifidus var. Tissier, 3 bifidus var. Pennsylvanicus, 6 clostridium naviculum, 2 clostridium polymyxa, 3 non-pathogenic staphylococci, 1 non-pathogenic enterococcus, 4 subtilis for each colibacillus. The clostridium which were used had been obtained by culture on broths with papain peptones of liver and soya, in the presence of glucose, in a nitrogen atmosphere.

EXAMPLE 8

An individual suffering from seasonal diarrhoea causing up to 12 liquid stools per day is treated with the medicine of Example 1 at the rate of 3 drinkable ampoules of 5 ml. per day (or about: 75 millions of microorganisms per day). It is found that the diarrhoea is completely stopped in 48 hours.

EXAMPLE 9

An invalid affected by persistent diarrhoea following a treatment for 8 days with tetracycline was given daily 3 ampoules with 5 ml. of medicament according to Example 1. The stools are normal after 3 days. 30 days after this treatment, there is no recidivation of the diarrhoea.

EXAMPLE 10

An invalid subjected to a treatment lasting 10 days with chloramphenicol at the rate of 2 g. per day was simultaneously given 2 (5 ml.) ampoules per day of the aforementioned medicine. The stools have remained normal and the invalid did not have any trouble either during or after the treatment.

EXAMPLE 11

In order to check the improvement in the efficacy of a colibacilli culture prepared according to the invention in buffered medium with respect to a normal culture of colibacilli of the already known type, clinical experiments were carried out on two groups of invalids. 6 invalids of a first group A and 10 invalids of a second group B underwent a treatment with antibiotics of the cycline series. After 5 days, the invalids had in general manner the following symptoms:

numerous stools (4 to 8 times per day),
clear-coloured liquid or pasty stools without odour,
presence in the stools of undigested cellulose (visible in the microscope).

The colitherapy was then instigated by causing the individuals of group A to absorb two 5 m. ampoules per day containing a broth of colibacilli of the same composition as that of Example 1, but without pH buffering substance. The individuals of group B were subjected to the same treatment and with the same doses, but with the buffered culture broth according to the invention.

The stools of the invalids of group A became normal again from the third day and it was necessary to continue the treatment for about 6 days.

As regards the invalids of group B, the improvement could be sensed from the first day and three days of treatment are sufficient in order completely to regularise the transit of fecal substances.

EXAMPLE 12

In 2 cases, analogous to that of Example 9, 3 gelatine-coated pills containing powder prepared by conventional lyophilisation according to Example 2 were administered per day. The return to normal stools was observed on the third day, as in Example 9.

EXAMPLE 13

Invalids having entirely the same symptoms as those of Examples 9 and 12 were caused to take every day 3 gelatine-coated pills of the product lyophilised by the special process described in Example 3. The stools had then become normal again after 2 days, instead of 3 days in Example 9.

EXAMPLE 14

15 invalids affected by antibiotic diarrhoea were daily given 3 gelatine-coated pills prepared according to the procedure of Examples 4 and 5. Each pill contained:

$6 \times 10^6$ non-pathogenic colibacilli, resistant to the antibiotics, and
$65 \times 10^6$ clostridium polymyxa obtained by culture under nitrogen, in a solution of a papain peptone of liver and glucose.

From the 12th hour, a very distinct improvement was observed. The final normal condition was obtained in 48 hours. Bacteriological experiments have shown in connection with these subjects a decrease in abnormal germs, particularly of proteus, during the treatment. On the contrary, it has assisted the reimplantation of the colibacillus.

The same treatment comprising 3 pills per day, applied systematically to 65 invalids, gave the same results in 64 cases, and the intestinal flora of the invalids remained stable. A condition of diarrhoea only occurred in one case, but this could be stopped in a few hours by a double dose of the medicine in question.

EXAMPLE 15

10 invalids affected by profuse febrile diarrhoea with 20 to 30 stools per day were treated with 3 pills per day of the same composition as in Example 14. The diarrhoea was generally stopped after 24 hours. It was sufficient to continue the treatment for 4 days at the rate of 2 pills per day in order to obtain complete normalisation of the intestinal flora.

EXAMPLE 16

In 12 cases similar to those of Example 15, the treatment consisted of 3 pills per day, prepared according to Example 7, the number of colibacilli per pill being $6 \times 10^6$; the numbers of the other microorganisms are apparent from the proportions indicated in Example 7.

The direct results were the same as in the 10 cases of Example 15, but the complete normalisation of the intestinal flora and a smaller degree of fatigue of the invalid were found from the 3rd day of the treatment.

EXAMPLE 17

A powder, prepared by lyophilisation according to Example 5, was used in order to prevent infantile diarrhoea. The following was administered in each feeding bottle: 100,000 living non-pathogenic colibacilli and 1,000,000 living bifidus bacilli.

The group of 50 infants fed in this way did not have any diarrhoea, whereas in another group of 50, some infants had periods of diarrhoea.

What is claimed is:

1. A process of preparing a medicament comprising lyophilising a liquid culture of non-pathogenic colibacilli which is resistant to antibiotics, said liquid culture also containing 2 to 100 grams of an animal mucin per liter.

2. A process according to claim 1 wherein there is also present during the lyophilisation glutamic acid or the alkali metal salts thereof.

3. A process of preparing a medicament comprising centrifuging a culture of living non-pathogenic colibacilli which are resistant to antibiotics together with at least one microorganism which is either bifidus or clostridium, re-suspending the centrifuged substance in a nutritive aqueous solution containing 2 to 100 grams of mucin of animal origin per liter, freezing the dispersion and subjecting the frozen dispersion to sublimation and distillation at a low pressure until it is transformed into a dry powder.

4. A composition suitable for lyophilisation of living non-pathogenic colibacilli comprising said bacilli, at least two pH buffering substances, and an animal mucin.

5. A medicament according to claim 4 wherein the amino acid is glutamic acid, the amount of mucin being between 2 and 50% of the weight of the nutrient substances of the culture.

6. Medicament for the treatment of illnesses connected with a lack of balance of the intestinal flora, comprising a culture of living non-pathogenic colibacilli which are resistant to antibiotics, a nutrient substance selected from the group consisting of glutamic acid and the alkali metal salts thereof, at least two pH-buffering substances in a quantity which fixes the pH of the culture at a value which is between 6 and 7.8 and an animal mucin.

7. Medicament for the treatment of illnesses connected with a lack of balance of the intestinal flora, comprising an effective amount of culture of living non-pathogenic colibacilli which are resistant to antibiotics, together with at least one microorganism which is either bifidus or clostridium in an amount greater than the amount of the said colibacilli, a nutrient substance selected from the group consisting of glutamic acid and the alkali metal salts thereof, at least two pH-buffering substances in a quantity which fixes the pH of the culture at a value which is between 6 and 7.8 and an animal mucin in an amount of 2% to 50% of the weight of the nutrient substances of the culture.

References Cited

UNITED STATES PATENTS 3,072,528  1/1963  Kludas _____ 167—73

OTHER REFERENCES

Kersten, "International Replacement of Bacteria Following Antibiotic Therapy," J. Iowa State Medical Society 48:5 (May 1958), pp. 240–243.

"Bacteriological Culture Media," Fisher Scientific (1963), pp. 1, 5, 36, 116, 167, 169.

Smith, David T., et al., Zinsser's Textbook of Bacteriology, Appleton-Century-Crafts, New York (1949), p. 119.

ALBERT T. MEYERS, *Primary Examiner.*

SAM ROSEN, *Examiner.*

S. J. SINGER, S. J. FRIEDMAN, *Assistant Examiners.*